US008516847B2

(12) United States Patent
Koh et al.

(10) Patent No.: US 8,516,847 B2
(45) Date of Patent: Aug. 27, 2013

(54) THERMAL STORAGE AIR CONDITIONER

(75) Inventors: Jae Yoon Koh, Seoul (KR); In Kyu Kim, Jinhae-si (KR); Jin Ha Hwang, Chungeheongbuk-do (KR)

(73) Assignee: LG Electronics Inc., Seoul (KR)

( * ) Notice: Subject to any disclaimer, the term of this patent is extended or adjusted under 35 U.S.C. 154(b) by 747 days.

(21) Appl. No.: 11/990,177

(22) PCT Filed: Jul. 27, 2006

(86) PCT No.: PCT/KR2006/002956
§ 371 (c)(1),
(2), (4) Date: Dec. 16, 2009

(87) PCT Pub. No.: WO2007/024063
PCT Pub. Date: Mar. 1, 2007

(65) Prior Publication Data
US 2010/0089080 A1    Apr. 15, 2010

(30) Foreign Application Priority Data
Aug. 22, 2005 (KR) ......... 10-2005-0076949

(51) Int. Cl.
*F25D 11/00* (2006.01)

(52) U.S. Cl.
USPC ............................. 62/430; 62/182

(58) Field of Classification Search
USPC ........... 62/430, 434–435, 510, 529, 208–210, 62/182
See application file for complete search history.

(56) References Cited

U.S. PATENT DOCUMENTS

| | | | | |
|---|---|---|---|---|
| 2,182,318 | A * | 12/1939 | Newill | 62/200 |
| 3,013,403 | A * | 12/1961 | Grant et al. | 62/510 |
| 4,135,571 | A * | 1/1979 | Tamblyn et al. | 165/236 |
| 4,727,726 | A | 3/1988 | Mitani et al. | |
| 4,735,064 | A * | 4/1988 | Fischer | 62/430 |
| 4,964,279 | A * | 10/1990 | Osborne | 62/59 |
| 5,305,613 | A * | 4/1994 | Hotta et al. | 62/209 |
| 6,568,197 | B2 * | 5/2003 | Uno et al. | 62/175 |

FOREIGN PATENT DOCUMENTS

| | | |
|---|---|---|
| CN | 1076774 | 9/1993 |
| CN | 1265732 | 9/2000 |
| CN | 1281128 | 1/2001 |
| JP | 06-241582 | 8/1994 |
| JP | 11-270920 | 10/1999 |
| JP | 2002-106998 | 4/2002 |

(Continued)

*Primary Examiner* — Brandon M Rosati
*Assistant Examiner* — Orlando E Aviles Bosques
(74) *Attorney, Agent, or Firm* — McKenna Long & Aldridge LLP

(57) ABSTRACT

The present invention relates to air conditioners, and more particularly, to a thermal storage air conditioner in which a cold heat is produced and stored in a tank during night time for using the cold heat during day time for cooling a room. For this, the thermal storage air conditioner includes an outdoor unit having an outdoor heat exchanger for making heat exchange, and at least one compressor for compressing refrigerant, an indoor unit having a plurality of indoor heat exchangers for making heat exchange, a thermal storage unit for storing energy, the thermal storage unit having a plurality of thermal storage heat exchangers for making heat exchange, and a functional unit having a plurality of valves for selective control of refrigerant flows among the outdoor unit, the indoor unit and the thermal storage unit according to an operation mode, and a valve controller for making a unitary control of operation of the valves.

14 Claims, 11 Drawing Sheets

(56) References Cited

FOREIGN PATENT DOCUMENTS

| JP | 2002-372328 | 12/2002 |
| JP | 2003-106575 | 4/2003 |
| JP | 2005-042980 | 2/2005 |
| KR | 10-2001-0027964 | 4/2001 |

* cited by examiner

THERMAL STORAGE AIR CONDITIONER

This application claims the benefit of PCT Patent Application No. PCT/KR2006/002956, filed Jul. 27, 2006, which claims the benefit of Korean Patent Application No. 10-2005-0076949, filed Aug. 12, 2005, which are both hereby incorporated by reference in their entirety.

TECHNICAL FIELD

The present invention relates to air conditioners, and more particularly, to a thermal storage air conditioner in which a cold heat is produced and stored in a tank during night time for using the cold heat during day time for cooling a room.

BACKGROUND ART

In general, the air conditioner is an appliance for cooling or heating a room by means of a refrigerating cycle of refrigerant having a compressor, a four way valve, an outdoor heat exchanger (a condenser or evaporator), an expansion device, and an indoor heat exchanger, for providing a comfortable room environment to a user.

Currently, for saving a utility power cost, the thermal storage air conditioner is also used in which the room is cooled by using a condensing heat source of ice produced during night time when people use less utility power during day time when people use more utility power.

FIG. 1 illustrates a diagram of an exemplary related art thermal storage air conditioner.

Referring to FIG. 1, the related art thermal storage air conditioner is provided with an outdoor unit 3, a thermal storage unit 10, and an indoor unit 20.

The outdoor unit 3 is provided with a compressor 1 for compressing refrigerant, and an outdoor heat exchanger 2 for making the refrigerant compressed to flow by the compressor 1 to heat exchange.

The thermal storage unit 10 is provided on one side of the outdoor unit 3 for temporary storage of energy. The thermal storage unit 10 is provided with a thermal storage tank 11 having a heat storage substance held therein, a water pump 12 for circulating water in the thermal storage tank 11, a heat exchanger 13 for heat exchange between the water and the refrigerant, and a refrigerant pump 14 for forced flow of refrigerant. The heat exchanger 13 is connected to one end of the thermal storage tank 11, and has cold water circulated therethrough from the thermal storage tank 11 by the water pump 12.

In the meantime, the indoor unit 20 is installed in the room which requires cooling, and is provided with an indoor heat exchanger 21 for making heat exchange, and an expansion device 22 for expanding refrigerant introduced to the indoor heat exchanger 21.

The related art thermal storage air conditioner makes ice in the thermal storage tank 11 of the thermal storage unit 10 during night time, and cools the room by using the ice in the thermal storage tank 11 made thus during day time (for an example, 13:00~16:00 hours) when a utility power consumption is great.

In this instance, the compressor 1 is stationary, and the refrigerant pump 14 circulates the refrigerant. Therefore, in the refrigerant cycle of this instance, the refrigerant is supplied to the indoor unit 20 by the refrigerant pump 14. The refrigerant supplied to the indoor unit 20 thus is passed through the expansion device 22, and made to heat exchange with air at the indoor heat exchanger 21 which serves as an evaporator. In this instance, since the indoor heat exchanger 21 absorbs heat from the air, to drop a temperature of the air blown through the indoor heat exchanger 21, the room is cooled.

The refrigerant absorbs heat at the indoor heat exchanger, introduced to the thermal storage tank 11, and discharges the heat to cold water at the heat exchanger 13, to return to cold refrigerant again. The cold refrigerant is then introduced to the refrigerant pump 14, to finish a cycle.

However, the related art thermal storage air conditioner has the following problems.

The related art thermal storage air conditioner has the outdoor unit 3 and the thermal storage unit fabricated as one unit. Therefore, separation of respective components is difficult.

Moreover, since the thermal storage unit 10 has all units required for cooling the room by using stored heat, such as the refrigerant pump 14 and so on, starting from the thermal storage tank 11 and the heat exchanger 13, mounted therein, assembly and installation is difficult and maintenance thereof is also very inconvenient.

DISCLOSURE OF INVENTION

Technical Problem

Accordingly, the present invention is directed to a thermal storage air conditioner that substantially obviates one or more problems due to limitations and disadvantages of the related art.

An object of the present invention is to provide a thermal storage air conditioner which permits easy assembly/disassembly, and maintenance, and to improve room cooling efficiency.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a thermal storage air conditioner includes an outdoor unit having an outdoor heat exchanger for making heat exchange, and at least one compressor for compressing refrigerant, an indoor unit having a plurality of indoor heat exchangers for making heat exchange, a thermal storage unit for storing energy, the thermal storage unit having a plurality of thermal storage heat exchangers for making heat exchange, and a functional unit having a plurality of valves for selective control of refrigerant flows among the outdoor unit, the indoor unit and the thermal storage unit according to an operation mode, and a valve controller for making a unitary control of operation of the valves.

In another aspect of the present invention, a thermal storage air conditioner includes an outdoor unit having an outdoor heat exchanger for making heat exchange, and at least one compressor for compressing refrigerant, an indoor unit having a plurality of indoor heat exchangers for making heat exchange, a plurality of indoor expansion devices for expanding refrigerant introduced to the indoor heat exchangers respectively, and an indoor controller for controlling operation of the indoor expansion devices, a thermal storage unit for storing energy by the heat exchange performed by the thermal storage heat exchangers, the thermal storage unit having a plurality of thermal storage heat exchangers for making heat exchange, a plurality of thermal storage expansion devices for expanding refrigerant introduced to the thermal storage heat exchangers respectively, and a thermal storage controller for controlling operation of the thermal storage expansion devices, and a functional unit having a first supplementary pump with one side connected to a pipe line connected to the thermal storage heat exchanger of the thermal storage unit and the other side connected a pipe line connected to the indoor unit, for pumping refrigerant heat exchanged at the thermal storage unit to the indoor unit, a supplementary heat exchanger unit for heat exchanging refrigerant heat exchanged at the indoor unit again, and supplying to the thermal storage unit, to circulate therethrough, a plurality of valves for selective control of refrigerant flows among the outdoor unit, the indoor unit, the thermal storage unit, the first supplementary pump, and the supplementary heat exchanger unit, and a valve controller for controlling of operation of the valves.

Advantageous Effects

Thus, since the thermal storage air conditioner of the present invention has the outdoor unit, the indoor units, the thermal storage unit, and the functional unit provided separately, and connected to one another, coupling/decoupling of the units are easy.

The easy coupling/decoupling of the functional unit and the thermal storage unit permits to couple the functional unit and the thermal storage unit even to an existing air conditioner.

Moreover, the thermal storage air conditioner of the present invention is controlled such that only some of the plurality of the thermal storage heat exchangers are operated according to a load on the indoor heat exchanger, automatically. Accordingly, the thermal storage air conditioner of the present invention has an advantage in that energy can be saved relative to a related art air conditioner in which a large capacity thermal storage heat exchanger is operated regardless of a number of operation of the plurality of the indoor units.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
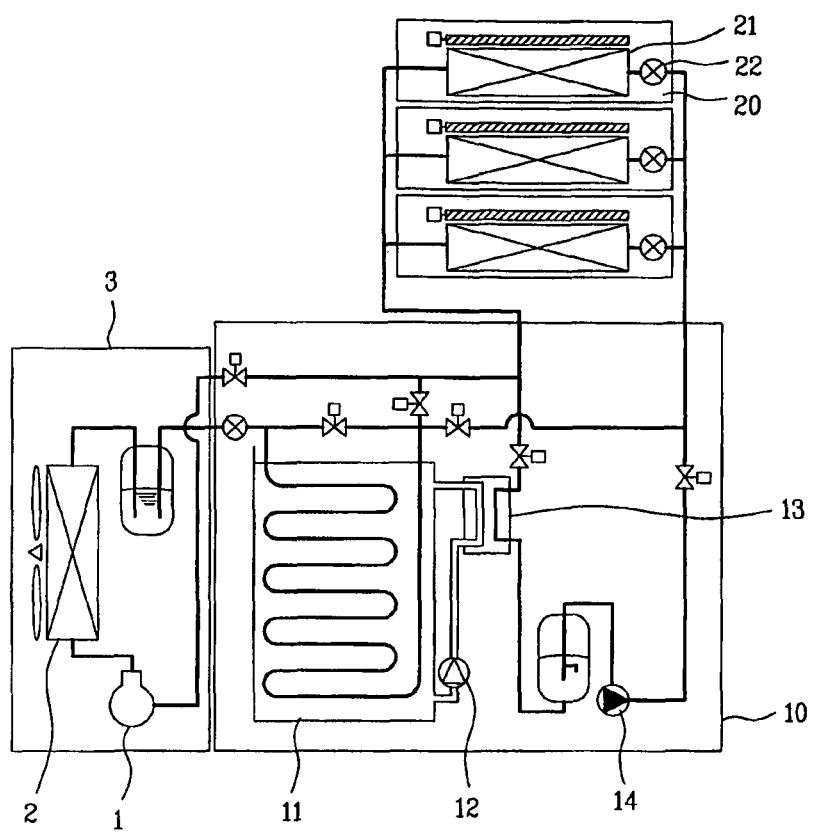
FIG. 1 illustrates a diagram of a related art thermal storage air conditioner, schematically.
Figure 2:
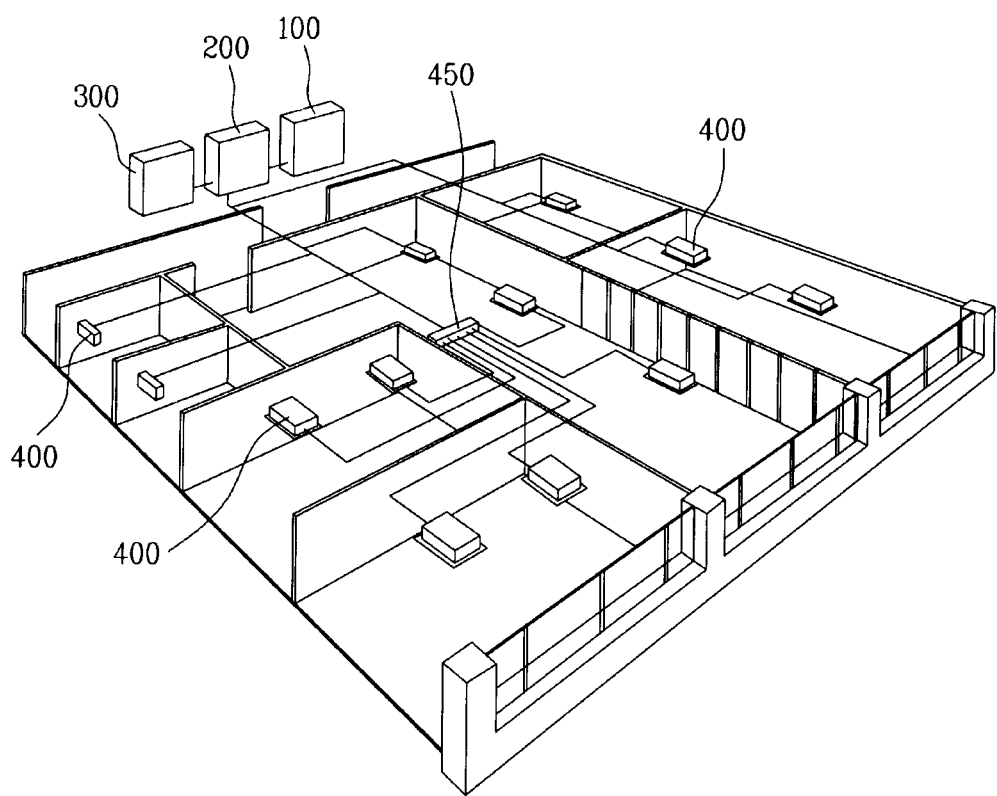
FIG. 2 illustrates a bird's eye view of a building showing installation of a thermal storage air conditioner in accordance with a preferred embodiment of the present invention.

FIG. 2 illustrates a bird's eye view of a building showing installation of a thermal storage air conditioner in accordance with a preferred embodiment of the present invention.

Referring to FIG. 2, on an outside of a building, there are an outdoor unit 100, a functional unit 200, and a thermal storage unit 300 of a thermal storage air conditioner installed independent from one another, each connected to indoor units 400 in the building with pipes.

One or a plurality of the indoor units 400 is installed. A variety of types of the indoor units 400 are installed in the rooms respectively, so as to be operative individually or as integrally. There may be a distribution head 450 in the building for distribution of refrigerant to the plurality of indoor units 400.

Figure 3:
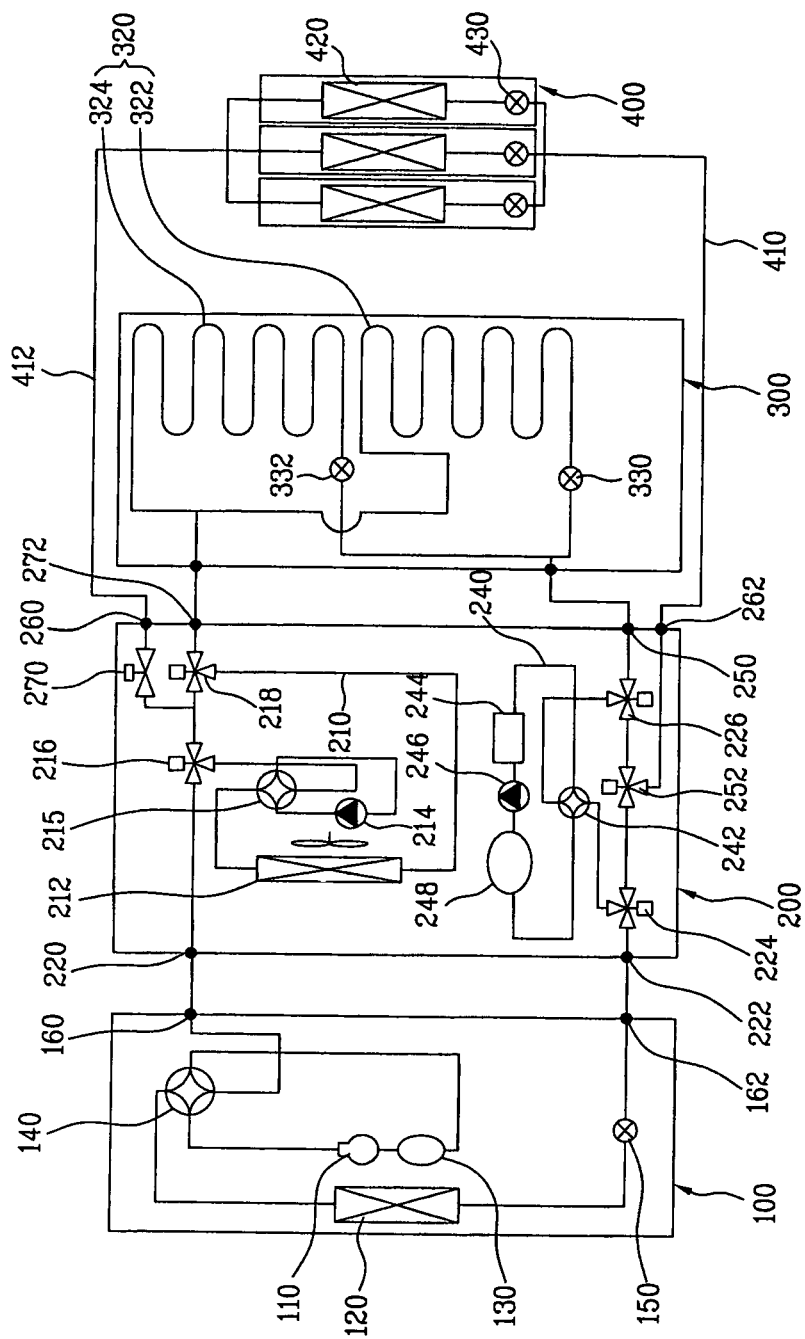
FIG. 3 illustrates a diagram of a thermal storage air conditioner in accordance with a preferred embodiment of the present invention.
Figure 4:
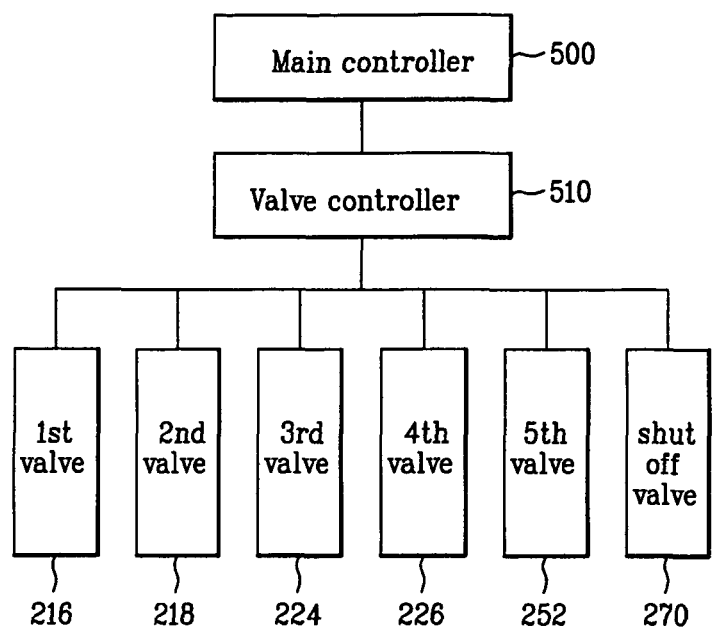
FIG. 4 illustrates a block diagram of a system for controlling valves in a functional unit, schematically.

FIG. 3 illustrates a diagram of a thermal storage air conditioner in accordance with a preferred embodiment of the present invention.

Referring to FIG. 3, the outdoor unit includes a compressor 110 for compressing refrigerant, and an outdoor heat exchanger 120 for making heat exchange between the refrigerant and environmental air.

There may be one or a plurality of the compressor 110 for compressing the refrigerant to high temperature, and high pressure. Though only one compressor 110 may be provided to compress the refrigerant, a constant speed compressor which is operative at a constant speed, and an inverter compressor which is a variable heat pump may be provided as one pair for operation according to a load thereon.

On one side of the compressor 110, there is an accumulator 130. The accumulator 130 collects liquid refrigerant from the refrigerant from the compressor 110 for only introducing gas refrigerant to the compressor 110.

In more detail, of the refrigerant introduced into the accumulator 130, the liquid refrigerant failed to vaporize yet but left as liquid still is held on a lower side of the accumulator 130 owing to density, to introduce only the gas refrigerant on an upper side of the accumulator 130 to the compressor 110.

The gas refrigerant is separated from the liquid refrigerant thus, because, if the liquid refrigerant failed to vaporize yet but left as liquid still is introduced into the compressor 110 directly, a load on the compressor 110 which compresses refrigerant to high temperature, high pressure refrigerant increases, to result in damage to the compressor 110.

The outdoor unit 100 has a four way valve 140 having a plurality of pipe lines connected thereto so as to be able to communicate with one another. The four way valve 140, arranged to change a refrigerant flow according to cooling/heating operation, has ports connected to an outlet of the compressor 110, an inlet of the accumulator 130, the outdoor heat exchanger 120, and the functional unit 200 or the indoor unit 400.

On an outlet side of the outdoor unit 120, there is an outdoor expansion device 150 for controlling a flow rate of the refrigerant passed through the outdoor heat exchanger 120.

The outdoor unit 100 is connected to the functional unit 200. Therefore, an outdoor low pressure connection 160 is provided at the pipe line connected to the four way valve 140, and an outdoor high pressure connection 162 is provided on one side of the outdoor expansion device 150.

Of course, the outdoor unit 100 may be connected to the indoor unit 400 directly. That is, the outdoor low pressure connection 160 is connected to an indoor low pressure flow line 412 to be described later, and the outdoor high pressure connection 162 may be connected to an indoor high pressure flow line 410 to be described later.

The functional unit 200, installed on one side of the outdoor unit 100, controls the refrigerant flow according to an operation condition.

The functional unit 200 has a supplementary flow line 210 provided with a supplementary heat exchanger 212 and a supplementary pump 214 on one side of the supplementary heat exchanger 212 for forcing the refrigerant flow.

The supplementary heat exchanger 212 makes heat exchange between the refrigerant and the outdoor air like the outdoor heat exchanger 120, and is operative selectively when the thermal storage unit 300 is used. That is, in a case the energy stored in the thermal storage unit 300 is used, the supplementary heat exchanger 212 is used only when required according to a capacity of the indoor unit 400 or a required temperature.

The supplementary pump 214 enforces the refrigerant flow to be introduced into the supplementary line 210 and the supplementary heat exchanger 212, and compresses the refrigerant. Mounted between the supplementary heat exchanger 212 and the supplementary pump 214, there is a first four way valve 215.

At both ends of the supplementary line 210, a first valve 216 and a second valve 218 are mounted respectively for opening/closing the supplementary line 210.

One end of the functional unit 200 is connected to the outdoor unit 100 so as to be in communication therewith. In more detail, the functional unit 200 has a functional low pressure connection 220 connected to the outdoor lower pressure connection 160 of the outdoor unit 100, and a functional high pressure connection 222 connected to the outdoor high pressure connection 162 of the outdoor unit 100.

In the functional unit 200, there is a third valve 224 and a fourth valve 226 mounted on a line extended from the functional high pressure connection 222. A liquid flow line 240 is branched from the third valve 224 and the fourth valve 226. That is, at both ends of the liquid flow line, the third valve 224 and the fourth valve 226 are mounted for controlling the refrigerant flow.

The liquid flow line 240 is a passage for guiding the refrigerant flow from the thermal storage unit 300 to the indoor unit 400 in a case the air conditioner is operational on the thermal storage unit 300. That is, the liquid flow line 240 serves as a passage for guiding the refrigerant from the thermal storage unit 300 to the indoor unit 400 in a thermal storage room cooling mode.

The liquid flow line 240 has an inlet and an outlet controlled by a second four way valve 242.

There is a dryer 244 mounted on the liquid flow line 240, for removing moisture from the refrigerant in the liquid flow line 240.

On one side of the dryer 244, there is a liquid pump 246, for enforcing the refrigerant flow in the liquid flow line 240, particularly, when the air conditioner is operational on the thermal storage unit 300.

On one side of the liquid pump 246, there is a receiver 248 for separating gas refrigerant from the liquid refrigerant.

In more detail, the receiver 248 holds surplus of refrigerant from the outdoor unit 100, and makes only liquid refrigerant to flow. That is, in 'the thermal storage room cooling mode', the receiver 248 makes only the liquid refrigerant to flow to the thermal storage unit 300.

The fourth valve 226 has one side connected to a high pressure thermal storage connection 250. The high pressure thermal storage connection 250 has one end of a pipe line of the thermal storage unit 300 connected thereto.

In the functional unit 200, there is a fifth valve 252 mounted on a pipe line between the third valve 224 and the fourth valve 226. The fifth valve 252 has an indoor high pressure flow line 410 connected thereto, which is connected to an indoor unit 400 to be described later.

The functional unit 200 is connected to the indoor unit 400 with the indoor high pressure flow line 410 and the indoor low pressure flow line 412. The functional unit 200 has an indoor high pressure connection 262 and an indoor low pressure connection 260 connected to the indoor high pressure flow line 410 and the indoor low pressure line 412, respectively.

The indoor low pressure connection 260 is a portion connected to a pipe line of the indoor unit 400 a relatively low pressure refrigerant flows therein in room cooling, and the indoor high pressure connection 262 is a portion connected to a pipe line of the indoor unit 400 a relatively high pressure refrigerant flows therein in room cooling.

Mounted on one side of the indoor low pressure connection 260, there is a shut off valve 270 for selective shut off of the refrigerant flow between the indoor unit 400 and the functional unit 200.

The functional unit 200 receives refrigerant from the thermal storage unit 300 through the low pressure thermal storage connection 272 connected to the second valve 218.

The thermal storage unit 300 is connected to the functional unit 200, and the refrigerant flow between the thermal storage unit 300 and the functional unit 200 is controlled by the second valve 218 and the fourth valve 226.

The thermal storage unit 300 has a thermal storage tank 310 provided therein for holding thermal storage substance. Accordingly, as the thermal storage substance is heated or cooled, heat is stored in the thermal storage tank 310. The thermal storage substance in the thermal storage tank 310 stores energy, and is preferably water $H_2O$ having a high density.

In the thermal storage tank 310, there is thermal storage heat exchanger 320. There are two thermal storage heat exchangers 320 provided thereto, for making heat exchange between the refrigerant therein and the thermal storage substance on an outside of the thermal storage tank 310. That is, the thermal storage heat exchanger 320 includes a first thermal storage heat exchanger 322 and a second thermal storage heat exchanger 324, to heat or cool the thermal storage substance in the thermal storage tank 310 depending on a temperature of the refrigerant in the thermal storage heat exchanger 320.

Mounted on one side of the first thermal storage heat exchanger 322, there is a first thermal storage expansion device 330, and mounted on one side of the second thermal storage heat exchanger 324, there is a second thermal storage expansion device 332. The first thermal storage expansion device 330 and the second thermal expansion device 332 control a refrigerant flow rate to the thermal storage unit 300, and make the refrigerant to expand to low temperature and low pressure.

As the first thermal storage expansion device 330 and the second thermal expansion device 332, a variety of types of valves, such as electronic expansion valves called as LEV (linear expansion valve), solenoid valves, and so on can be used.

Accordingly, in the thermal storage mode, the first thermal storage expansion device 330 and the second thermal storage expansion device 332 expands the refrigerant condensed at the outdoor heat exchanger 120 adiabatically, to drop a temperature and a pressure of the refrigerant, and forwards a flow rate of the refrigerant proper to a load to the thermal storage heat exchanger 320.

It is preferable that the first thermal storage expansion device 330 and the second thermal storage expansion device 332 adjust openings of valves to adjust flow rates of decompressed refrigerant, actively.

The indoor unit 400 includes an indoor heat exchanger for making heat exchange, and an indoor expansion device 430 for expanding the refrigerant and controlling the flow rate of the refrigerant.

There is one or two indoor unit 400, having a capacity proper to cool or heat a room space.

The indoor expansion device 430 is an LEV like the first thermal storage expansion device 330 and the second thermal storage expansion device 332. Therefore, in 'the direct room cooling mode' the indoor expansion device 430 expands the refrigerant condensed at the outdoor heat exchanger 120 adiabatically, to drop a temperature and a pressure of the refrigerant, and forwards a flow rate of the refrigerant proper to a load to the indoor heat exchanger 420.

In the meantime, it is preferable that the plurality of valves in the functional unit 200 are opened/closed automatically by a valve controller 510. That is, the first valve 216, the second valve 218, the third valve 224, the fourth valve 226, the fifth valve 252, and the shut off valve 270, which are opened/closed selectively depending on an operation condition, are controlled by the valve controller 510, automatically. The valve controller 510 is under the control of a main controller 500 which controls overall operation of the thermal storage air conditioner. That is, the main controller 500 provides operation mode information to the valve controller 510 according to a selected operation mode, and the valve controller 510 controls the valves to control refrigerant flows to/from various units according to the operation mode information from the main controller 500.

It is preferable that, besides the valves 216, 218, 224, 226, 252, and 270, the valve controller 510 controls operation of other units, such as the first four way valve 215, the second four way valve 242, and so on, in the functional unit 200.

Figure 5:
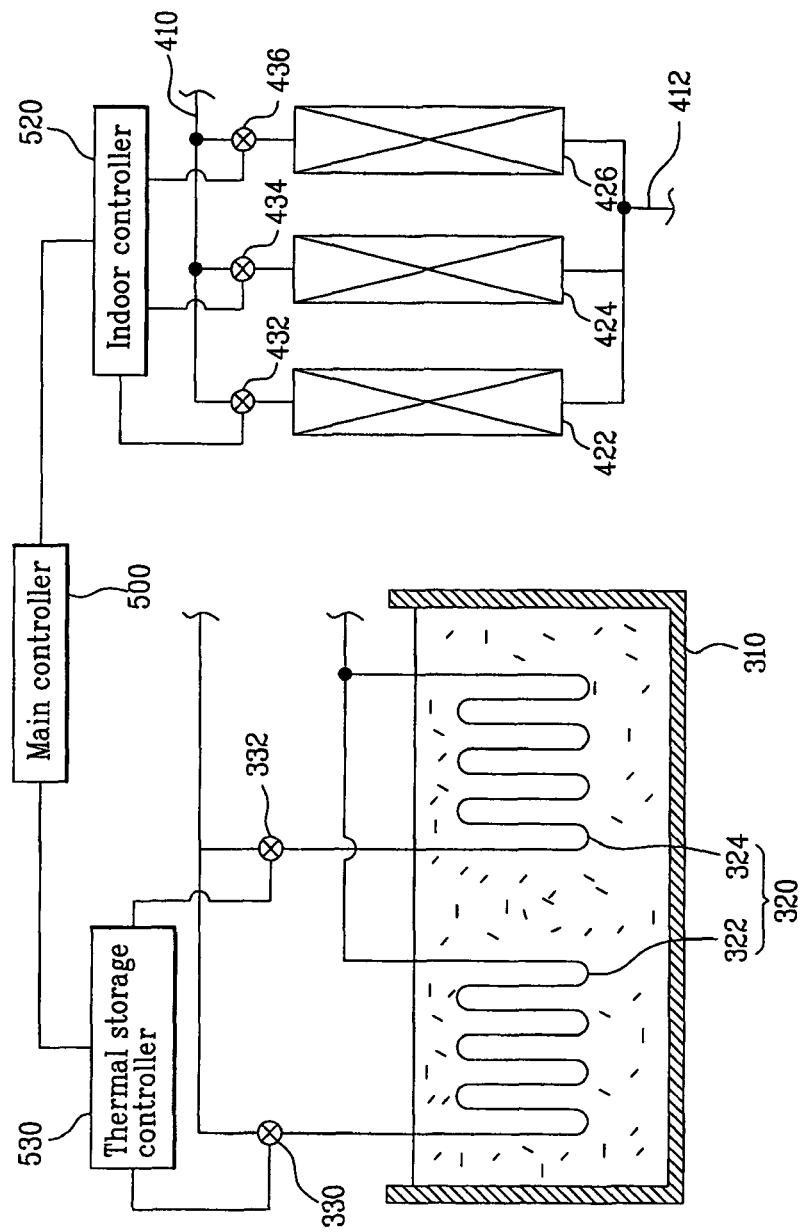
FIG. 5 illustrates a block diagram of a system for controlling an indoor unit and a thermal storage unit in accordance with a preferred embodiment of the present invention, schematically.

Referring to FIG. 5, the plurality of indoor expansion devices 432, 434 and 436 are controlled by an indoor controller. The plurality of thermal storage expansion devices 330, and 332 are controlled by a thermal storage controller 530.

Connected to the indoor controller 520, there are a first indoor expansion device 432, a second indoor expansion device 434, and a third indoor expansion device 436. Therefore, the first indoor expansion device 432, the second indoor expansion device 434, and the third indoor expansion device 436 are controlled by the indoor controller 520, individually.

Connected to the thermal storage controller 520, there are a first thermal storage expansion device 330, and a second thermal storage expansion device 332. Therefore, the first thermal storage expansion device 330, and the second thermal storage expansion device 332 are opened/closed by the thermal storage controller 530, individually.

The thermal storage controller 530 opens/closes the plurality of thermal storage expansion devices 330, and 332 selectively according to loads on the plurality of indoor heat exchangers 422, 424, and 426. Therefore, it is preferable that the indoor controller 520 and the thermal storage controller 530 are controlled by the main controller 500, automatically.

The main controller 500 is a microcomputer for general control of the operation of the thermal storage air conditioner, wherein a number of indoor units under operation is detected to calculate a total load, and gives a control order to the thermal storage controller 530 according to the load. That is, the main controller 500 puts all the thermal storage heat exchangers 320 into operation if all the indoor heat exchangers 422, 424 and 426 are in operation, and, if only some of the indoor heat exchangers 422, 424 and 426 are in operation, calculates a load to determine a number of the thermal storage heat exchangers 320 to be operated, and opens/closes the thermal storage expansion devices 330, and 332, selectively.

Accordingly, in a case the load on the indoor units 400 is low in 'a room cooling with stored heat mode' to be described later relatively, only some of the thermal storage heat exchangers 320 are operated, and in a case the load on the indoor units 400 is high, all the thermal storage heat exchangers 320 are operated, to carry out operation of the thermal storage heat exchangers 320 according to the load.

In more detail, for an example, because a relatively high load is required if all the first indoor heat exchanger 422, the second indoor heat exchanger 424, and the third indoor heat exchanger 426 are operated, the thermal storage controller 530 controls to open all the first thermal storage expansion device 330, and the second thermal expansion device 332. According to this, in this instance, both the first thermal storage heat exchanger 322 and the second thermal storage heat exchanger 324 are operated.

Opposite to this, of the plurality of indoor units 400, a load required is relatively low if only the first indoor heat exchanger 422 and the second indoor heat exchanger 424 are operated, the main controller 500 provides such a operation state of the indoor units 400 to the thermal storage controller 530, and the thermal storage controller 530 opens only the first thermal storage expansion device 330 according to such information.

Then, there is no refrigerant flow to the second thermal storage heat exchanger 324, to make heat exchange only at the first thermal storage heat exchanger 322.

Figure 6:
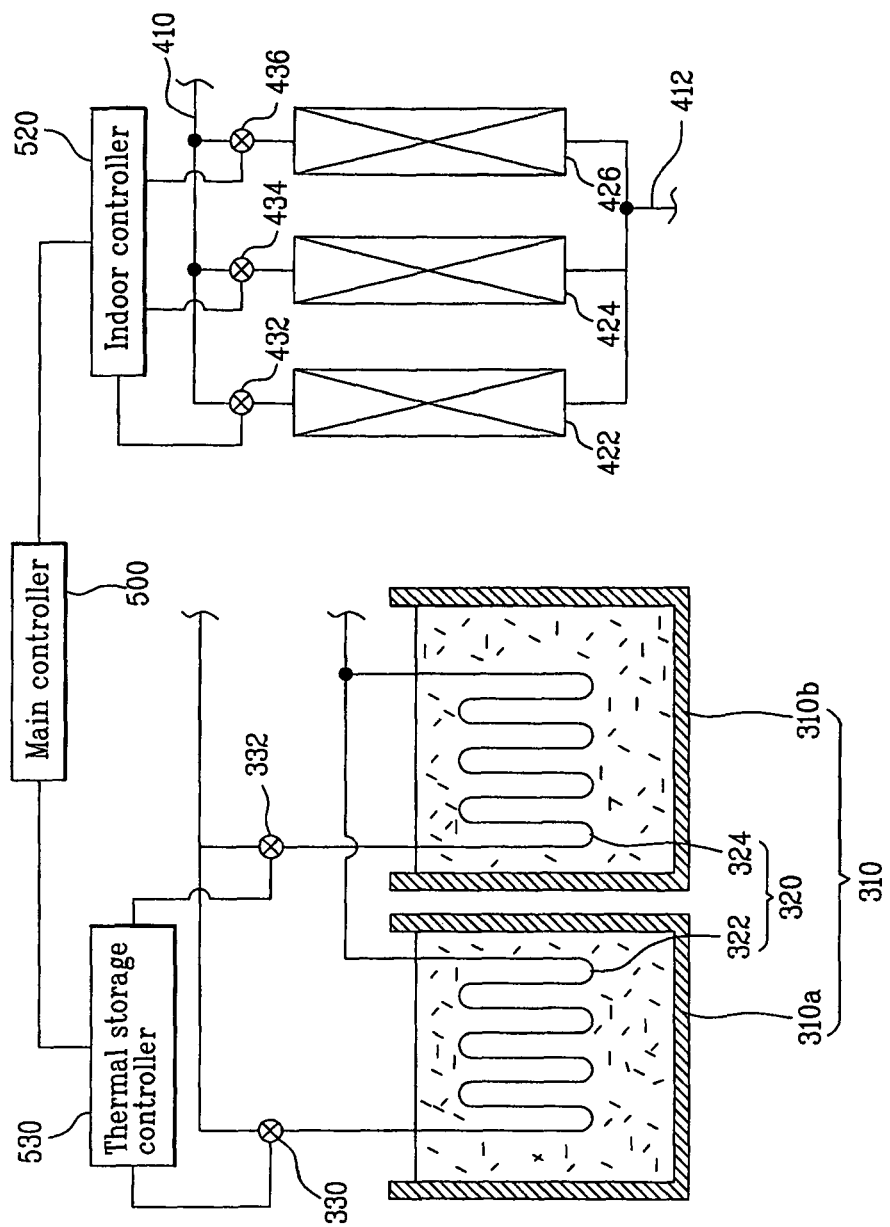
FIG. 6 illustrates a block diagram of a system for controlling an indoor unit and a thermal storage unit in accordance with another preferred embodiment of the present invention, schematically.

Though the foregoing thermal storage air conditioner shows a plurality of thermal storage heat exchangers 320 of the thermal storage unit 300 mounted in one thermal storage tank 310 as an example, all the plurality of thermal storage heat exchangers 320 may not be mounted in the one thermal storage tank 310, but, as shown in FIG. 6, may be mounted, individually. That is, it is also possible that the thermal storage tank 310 may have a first thermal storage tank 310a and a second thermal storage tank 310b, and the first thermal storage heat exchanger 322 and the second thermal storage heat exchanger 324 may be mounted in the first thermal storage tank 310a and the second thermal storage tank 310b, respectively.

The operation of the thermal storage air conditioner will be described, taking a case of room cooling as an example.

Figure 7:
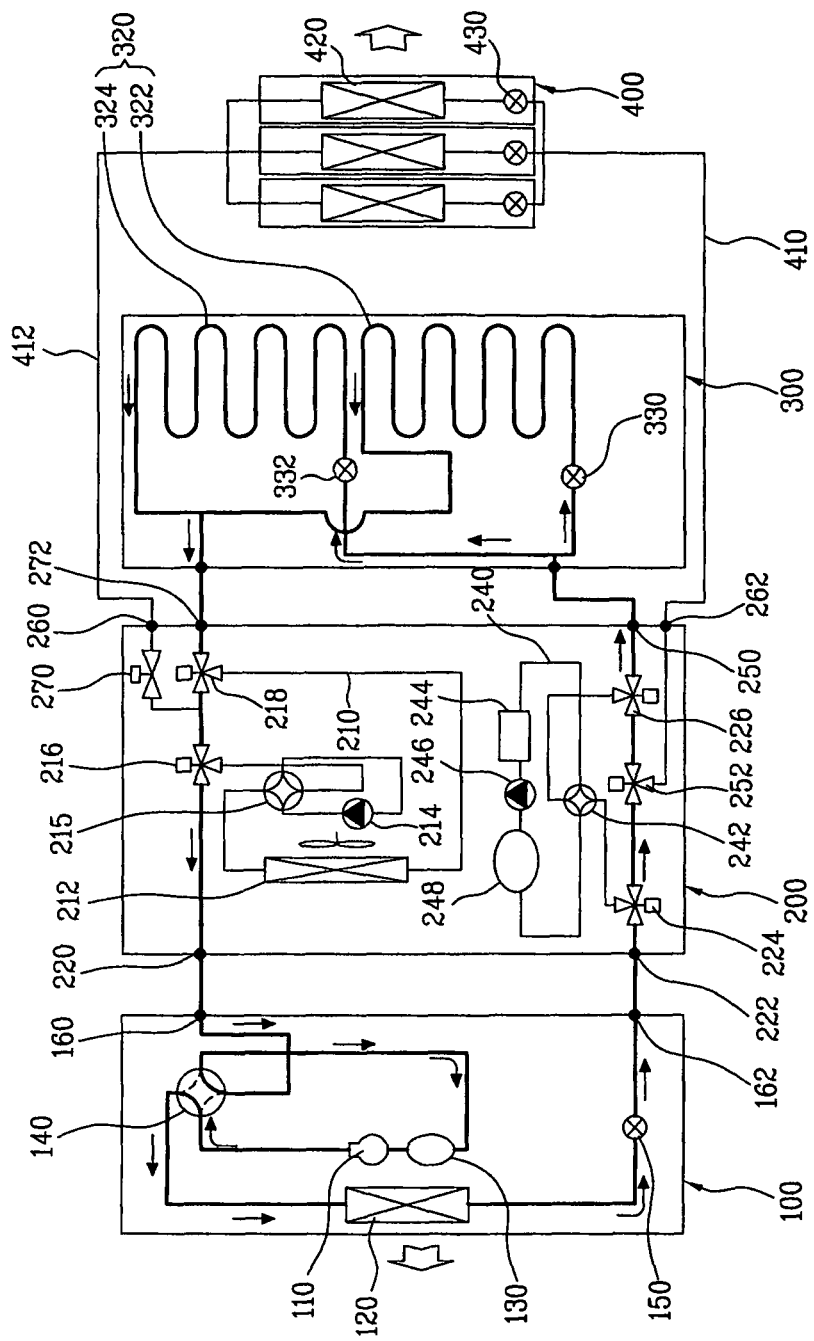
FIG. 7 illustrates a diagram showing a refrigerant flow of a thermal storage air conditioner in accordance with a preferred embodiment of the present invention in 'a thermal storage mode'.

At first, a case the thermal storage air conditioner of the present invention is operational in 'a thermal storage mode' with reference to FIG. 7.

In 'the thermal storage mode', it is intended to store an energy in the thermal storage unit 300 in advance during the night time, i.e., in a period power consumption is low, more specifically, it is intended to change a phase of a thermal storage substance (ice making, if the thermal storage substance is water) held in the thermal storage tank 310 of the thermal storage unit 300.

In more detail, if the user selects the 'thermal storage mode', the main controller 500 provides such information (information that the 'thermal storage mode is selected) to the valve controller 510.

Then, the valve controller 510 controls such that refrigerant flows through the indoor low pressure flow line 412 and the indoor high pressure flow line 410 are cut off by the shut off valve 270 and the fifth valve 252, to stop refrigerant flow between the indoor units 400 and the functional unit 200. The first valve 216 and the second valve 218 stop a refrigerant flow led to the supplementary flow line 210, and the third valve 224 and the fourth valve 226 cut off the liquid flow line 240.

Accordingly, as shown in arrows, by the compressor 110, the refrigerant is compressed to a high pressure, and introduced to the outdoor heat exchanger 120 through the four way valve 140.

In general, since the outdoor heat exchanger 120 is installed on an outside of a building, the refrigerant flowing through an inside of the outdoor heat exchanger 120 heat exchanges with air on an outside of the building.

Since it is in the 'thermal storage mode', the refrigerant in the outdoor heat exchanger 120 discharges heat to the air outside of the building. That is, since the outdoor heat exchanger 120 serves as a condenser, the refrigerant is cooled by means of heat exchange with the air outside of the building, to become liquid refrigerant (of course, not a perfect liquid refrigerant).

Then, the refrigerant is discharged from the outdoor heat exchanger unit 120, passes through the outdoor expansion device 150, and is introduced to the functional unit 200.

The refrigerant is then introduced into the thermal storage unit 300. That is, because the liquid flow line 240 is cut off by the third valve 224 and the fourth valve 226, the refrigerant introduced into the functional unit 200 flows led to the thermal storage unit 300 through the high pressure thermal storage connection 250, directly.

The refrigerant introduced into the thermal storage unit 300 is split into two, and passes through the first thermal storage expansion device 330 and the second thermal storage expansion device 332, respectively. The refrigerant passed through the first thermal storage expansion device 330 and the second thermal storage expansion device 332 becomes relatively low temperature, low pressure refrigerant by the expansion, more preferably a refrigerant at a temperature below zero.

The refrigerant passed through the first thermal storage expansion device 330 and the second thermal storage expansion device 332 heat exchanges as the refrigerant passes through the first thermal storage heat exchanger 322 and the second thermal storage heat exchanger 324. In this instance, the first thermal storage heat exchanger 322 and the second thermal storage heat exchanger 324 serve as evaporators, to drop a temperature of the thermal storage substance held in the thermal storage tank 310, to change a phase (freezing) of the thermal storage substance in the thermal storage tank 310, at the end. That is, the thermal storage substance in the thermal storage tank 310 has a temperature dropped, to have a phase (freezing) changed gradually starting from a circumference of the thermal storage heat exchanger 320.

The refrigerant deprived of heat as the refrigerant passes through the thermal storage heat exchanger 320 is vaporized to gas, and introduced into the functional unit 200 through the low pressure thermal storage connection 272. Because the second valve 218 and the first valve 216 cut off a flow line led to the supplementary flow line 210, the refrigerant introduced into the functional unit 200 does not pass through the supplementary flow line 210, but is introduced into the outdoor unit 100 through the functional low pressure connection 220 and the outdoor low pressure connection 160. The refrigerant introduced into the outdoor unit 100 is guided to the accumulator 130 through the four way valve 140.

The accumulator 130 filters liquid state refrigerant, only to introduce gas state refrigerant to the compressor 110.

According to above steps, a cycle of the 'thermal storage mode' is completed, and in the 'thermal storage mode', a phase change is progressed in the thermal storage tank 310 of the thermal storage unit 300 (ice is made if the thermal storage substance is water).

Figure 8:
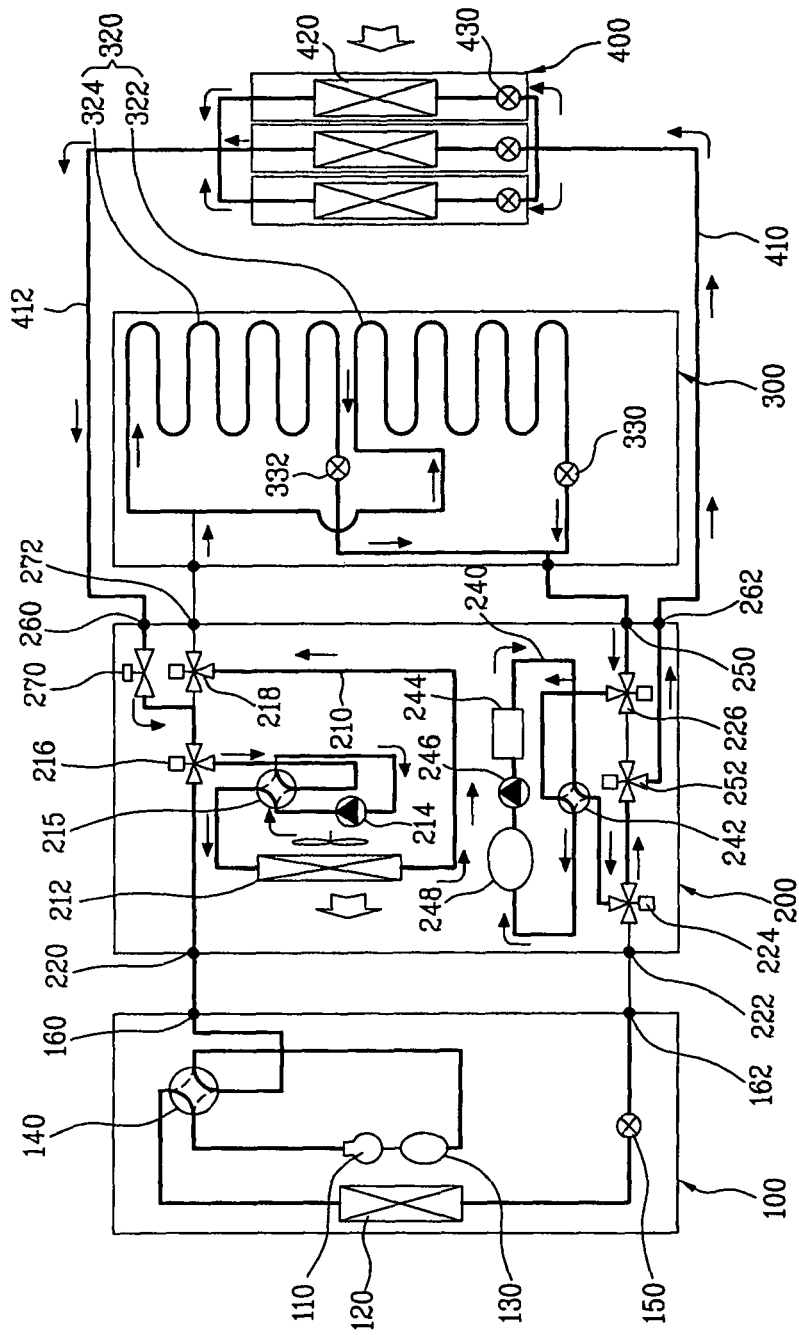
FIG. 8 illustrates a diagram showing a refrigerant flow of a thermal storage air conditioner in accordance with a preferred embodiment of the present invention in 'a room cooling with stored heat mode'.

FIG. 8 illustrates a refrigerant flow in 'a room cooling with stored heat mode'. That is, a process for cooling a room by using energy storage by above 'thermal storage mode' is shown.

In 'the room cooling with stored heat mode' is mostly used during day time when the power consumption is great, to cool a room by using the energy stored during night time.

In this instance, the refrigerant flows through the functional unit 200, the thermal storage unit 300, and the indoor unit 400, and there is no refrigerant flow at the outdoor unit 100. That is, the valve controller 510 controls the first valve 216 and the third valve 224 to cut the refrigerant flow to the outdoor unit 100, and to allow the refrigerant flow to the supplementary flow line 210 and the liquid flow line 240. The second valve 218 is controlled to cut off a flow line connected to the first valve 216, and to open flow lines led to the supplementary flow line 210 and the low pressure thermal storage connection 272. The fourth valve 226 is controlled to cut off a flow line connected to the fifth valve 252, and to open flow lines led to the liquid flow line 240 and the high pressure thermal storage connection 250. The fifth valve 252 opens a flow line led to the indoor high pressure flow line 410, and cuts off a flow line connected to the fourth valve 226. The shut off valve 270 is opened.

At first, the refrigerant introduced to the functional unit 200 through the high pressure thermal storage connection 250 will be described.

In this instance, since the liquid flow line 240 is opened by the third valve 224 and the fourth valve 226, the refrigerant introduced to the functional unit 200 from the thermal storage unit 300 flows through the liquid flow line 240.

The refrigerant flow through the liquid flow line 240 is forced by the liquid pump 246. Therefore, the refrigerant flowing through the liquid flow line 240 has moisture and gas refrigerant therein removed therefrom as the refrigerant passes through the receiver 248 and the liquid pump 246.

In more detail, the receiver 248 removes the gas refrigerant, and the dryer 244 removes the moisture from the refrigerant.

Accordingly, the liquid refrigerant passed through the liquid flow line 240 passes through the second four way valve 242, the third valve 224, and the fifth valve 252 in succession, and is introduced to the indoor unit 400 through the indoor high pressure connection 262.

Since there are a plurality of the indoor units 400, the refrigerant supplied from the functional unit 200 is distributed uniformly to the indoor unit 400. The refrigerant introduced to the indoor units 400 passes through a plurality of the indoor expansion devices 430, respectively.

The refrigerant passed through the indoor expansion device 430 becomes to have a low pressure, and is introduced to, and heat exchanges at the indoor heat exchanger 420. That is, heat exchange takes place between the refrigerant flowing through an inside of the indoor heat exchanger 420 and the air in the room, and as the indoor heat exchanger 420 serves as an evaporator, the refrigerant takes heat from the room air.

Thus, the refrigerant vaporized to a gas state as the refrigerant passes through the indoor heat exchanger 420, and the room air has heat taken therefrom to cool the room.

The refrigerant from the indoor heat exchanger 420 is guided by the indoor low pressure flow line to the functional unit 200 through the indoor low pressure connection 260. In this instance, the refrigerant passed through the shut off valve 270 is introduced to the supplementary flow line 210 through the first valve 216. The refrigerant introduced to the supplementary flow line 210 is enforced to flow to the supplementary heat exchanger 212 by the supplementary pump 214.

The supplementary heat exchanger 212 is a small sized heat exchanger, serving as a condenser. Therefore, the refrigerant passed through the supplementary heat exchanger 212 has a temperature thereof dropped by the supplementary heat exchanger 212.

The refrigerant passed through the supplementary heat exchanger 212 passes through the second valve 218 and the low pressure thermal storage connection 272 in succession, and is introduced to the thermal storage unit 300. The refrigerant introduced to the thermal storage unit 300 passes through the thermal storage heat exchanger 320.

Heat exchange is caused at the thermal storage heat exchanger 320. That is, heat exchange takes place between the refrigerant in the thermal storage heat exchanger 320 and the thermal storage substance (ice) in the thermal storage tank 310. Accordingly, the thermal storage substance (ice) in the thermal storage tank 310 takes heat from the refrigerant in the thermal storage heat exchanger 320 and is melted, through which process, the refrigerant passed through an inside of the thermal storage heat exchanger 320 becomes to have a low temperature.

The refrigerant discharged from the thermal storage heat exchanger 320 is introduced to the functional unit again through the high pressure thermal storage connection 250.

According to above steps, a cycle of the 'room cooling with stored heat mode' is completed, to cool the room.

As described before, in the room cooling with stored heat mode, the main controller 500 provides information on the load of the indoor units 400, i.e., an operational load of the indoor heat exchangers 420 to the thermal storage controller 530, to control the thermal storage expansion devices 330, and 332 of the thermal storage unit 300, thereby making an operation according to the load.

Figure 9:
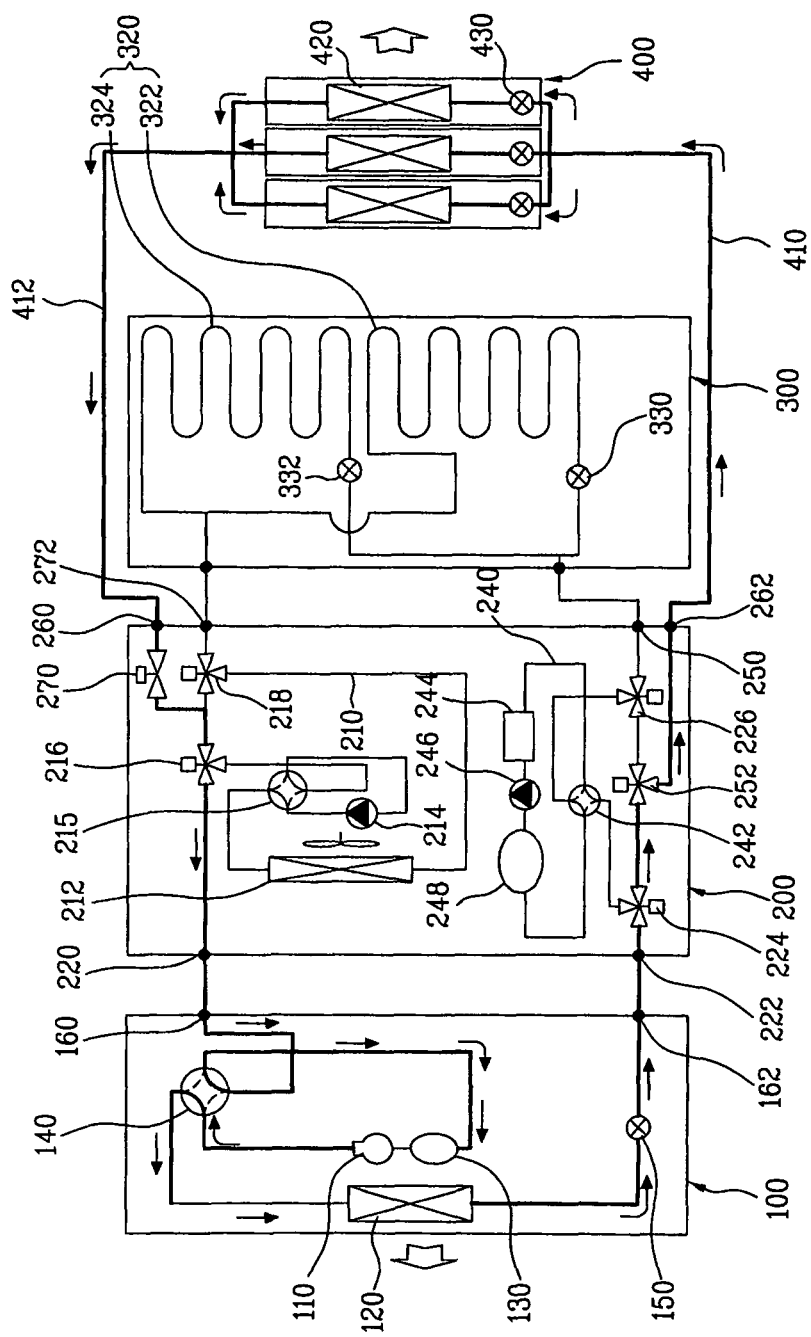
FIG. 9 illustrates a diagram showing a refrigerant flow of a thermal storage air conditioner in accordance with a preferred embodiment of the present invention in 'a direct room cooling mode'.

FIG. 9 illustrates 'a direct room cooling mode' in which the room is cooled, not by using the thermal storage unit 300, but by using the outdoor unit 100, directly.

In the direct cooling mode, the valve controller 510 controls such that the shut off valve 270 is opened, and the first valve 216 and the second valve 218 cut of flow lines led to the supplementary flow line 210. The valve controller 510 also controls such that the third valve 224 and the fourth valve 226 cut off flow lines led to the liquid flow line 240. The valve controller 510 also controls such that the fifth valve 252 cuts off a flow line connected to the fourth valve 226, and opens a flow line connected to the indoor high pressure flow line 410.

Upon putting the compressor 110 into operation, the high pressure refrigerant from the compressor 110 is introduced to the outdoor heat exchanger 120 through the four way valve 140. Since the outdoor heat exchanger 120 serves as a condenser, the outdoor air takes heat from the refrigerant, to make the refrigerant to be low temperature liquid refrigerant.

The refrigerant passed through the outdoor heat exchanger 120 passes through the outdoor expansion device 150 and introduced to the functional unit 200. The refrigerant introduced to the functional unit 200 passes through the third valve 224, the fifth valve 252, and the indoor high pressure connection 262 in succession, and is introduced to the indoor unit 400, directly. That is, refrigerant flow to the thermal storage unit 300 is cut off.

Since there are the plurality of the indoor units 400, the refrigerant supplied from the functional unit 200 is distributed uniformly to the indoor unit 400. The refrigerant introduced to the indoor units 400 passes through a plurality of the indoor expansion devices 430, respectively.

The refrigerant passed through the indoor expansion device 430 becomes to have a low pressure, and is introduced to, and heat exchanges at the indoor heat exchanger 420. That is, heat exchange takes place between the refrigerant flowing through an inside of the indoor heat exchanger 420 and the air in the room, and as the indoor heat exchanger 420 serves as an evaporator, the refrigerant takes heat from the room air.

Thus, the refrigerant vaporized to a gas state as the refrigerant passes through the indoor heat exchanger 420, and the room air has heat taken therefrom to cool the room. This is the same with the operation of the indoor unit 400 in the 'room cooling with stored heat mode' described before.

The refrigerant from the indoor heat exchanger 420 is guided by the indoor low pressure flow line to the functional unit 200 through the indoor low pressure connection 260. In this instance, the refrigerant passed through the shut off valve 270 is introduced to the supplementary flow line 210 through the first valve 216.

In this instance, since the shut off valve 270 is opened, and the first valve 216 cut off a refrigerant flow to the supplementary flow line 210, the refrigerant introduced to the functional unit 200 is introduced to the outdoor unit 100 through the functional low pressure connection 220 and the outdoor low pressure connection 160.

The refrigerant introduced to the outdoor unit 100 is guided to the accumulator 130 through the four way valve 140. The accumulator 130 has liquid state refrigerant filtered from the refrigerant only to introduce gas state refrigerant to the compressor 110.

According to above steps, the 'direct room cooling mode' is completed.

Figure 10:
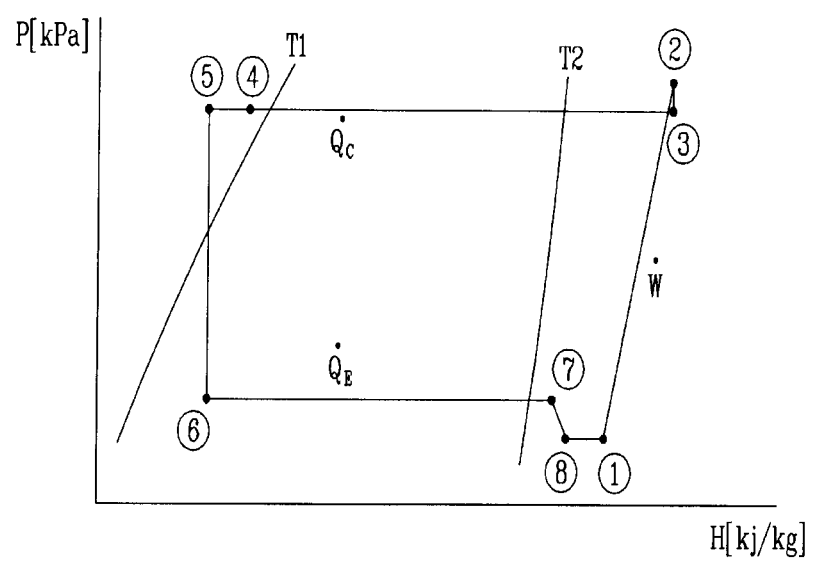
FIG. 10 illustrates a p-h chart of a thermal storage air conditioner in accordance with a preferred embodiment of the present invention in 'a thermal storage mode'.

FIG. 10 illustrates a p-h chart in 'a thermal storage mode' in FIG. 7, schematically.

①  and ② denote states before and after the compressors respectively, and ③ and ④ denote states at an inlet and an outlet of the outdoor heat exchanger 120 serving as a condenser, respectively. That is, a refrigerant pressure rises at the compressor 110, and there is no pressure change at the outdoor heat exchanger 120 during heat exchange takes place, but has a change of enthalpy h by the temperature change.

A symbol ⑤ denotes a state of the refrigerant introduced into the functional unit 200, and ⑥ and ⑦ denote states of refrigerant before and after the thermal storage heat exchanger 320, respectively.

In more detail, the refrigerant is involved in pressure drop as the refrigerant passes through the indoor heat expansion device 430 (⑤→⑥). There is no pressure change in the thermal storage heat exchanger 320 which serves as a vaporizer, during which process enthalpy h increases due to increase of a temperature of the refrigerant. An unexplained symbol ⑧ denotes a state of the refrigerant introduced to the outdoor unit 100 from the functional unit 200.

In the meantime, though the foregoing description has been based on cooling operation of the thermal storage air conditioner of the present invention, the thermal storage air conditioner can be used for heating a room.

That is, as an example, though the foregoing description shows a case in which the thermal storage tank 310 of the thermal storage unit 300 is used as a room cooling thermal storage tank during night time to change a phase (ice making) of thermal storage substance for room cooling, the refrigerant flow may be reversed, to use the thermal storage tank 310 as a room heating thermal storage tank.

In this case, the thermal storage substance in the thermal storage tank 310 is involved in a temperature rise to a high temperature to accumulate thermal energy, and the room is heated by using the thermal energy during day time.

Or alternatively, a room cooling thermal storage tank and a room heating thermal storage tank may be provided separately, to use the room cooling thermal storage tank in room cooling and to use the room heating thermal storage tank in room heating.

Since operation principles of the room cooling and room heating systems are the same with an operation principle of a general room cooling/heating air conditioner, detailed description of which will be omitted.

The outdoor unit 100 and the thermal storage unit 300 may be installed on various positions depending on strength of the building or user's convenience.

Figure 11:
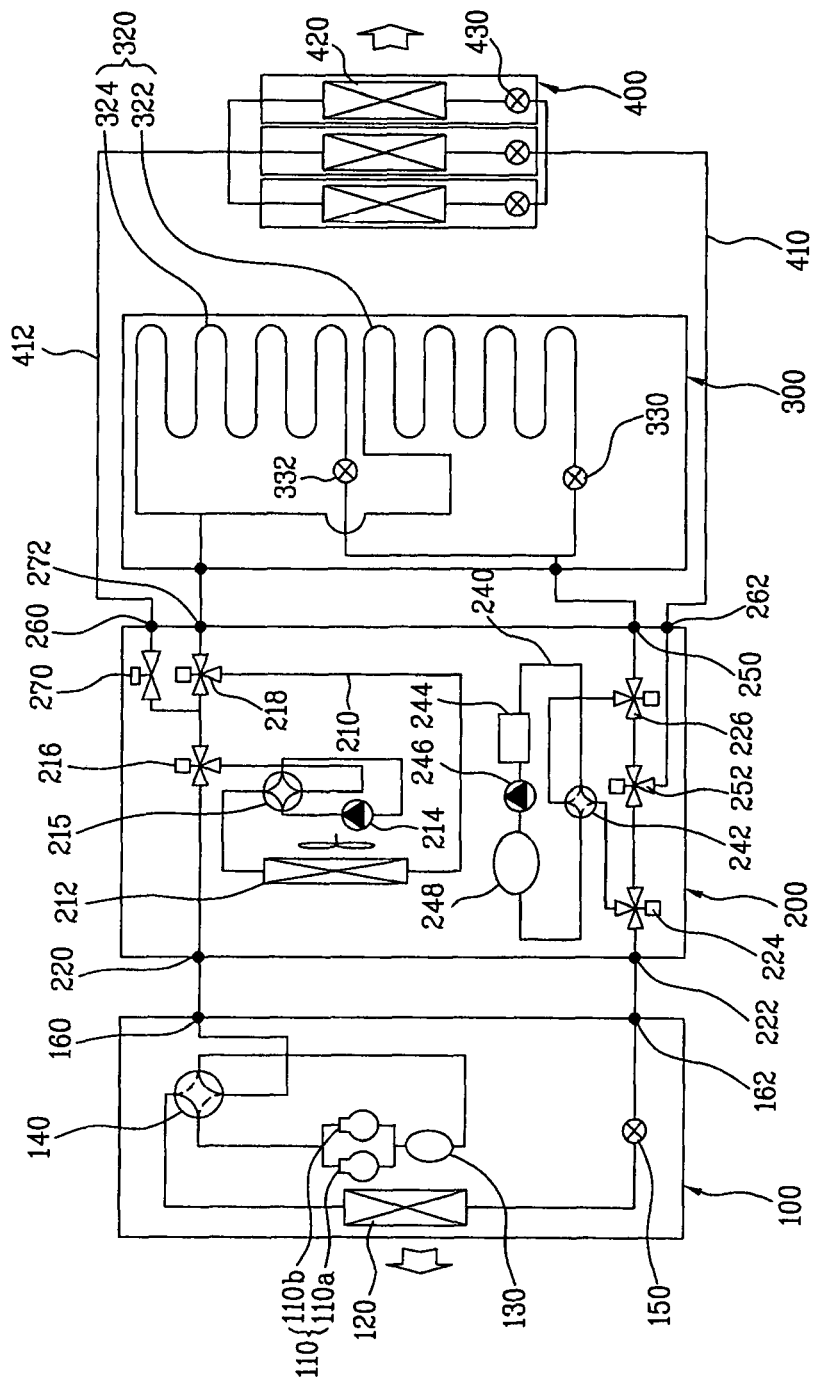
FIG. 11 illustrates a diagram of a thermal storage air conditioner in accordance with another preferred embodiment of the present invention.

In the meantime, FIG. 11 illustrates a diagram of a thermal storage air conditioner in accordance with another preferred embodiment of the present invention. Basic system of the second embodiment thermal storage air conditioner is identical to the foregoing embodiment except that the second embodiment thermal storage air conditioner has two compressors 110 in the outdoor unit 100.

That is, the compressor 110 of the outdoor unit 100 of the embodiment includes a constant speed compressor 110a which runs at a fixed speed, and an inverter compressor 110b which is a variable speed heat pump as one pair, for providing a capacity varied with a load.

It is preferable that a scroll compressor is used as the compressor 110 having low noise and good efficiency, particularly, an inverter scroll compressor is used as the inverter compressor 110b, of which rotation speed is controlled according to a load. Accordingly, if a small number of indoor heat exchangers 420 are used, with a low load, the inverter compressor 110b is operated at first, and, if the load increases gradually to a level unable to support the load only with the inverter compressor 110b, the constant speed compressor 110a is operated additionally, to increase a compression capacity of the refrigerant.

If the compressor includes the constant speed compressor 110a and the inverter compressor 110b to operate selectively according to load of the indoor unit 400, power can be reduced compared to a case when it is required to operate one large capacity constant speed compressor always.

Of course, though it is preferable that the inverter compressor 110b and the constant speed compressor 110a are used selectively as the compressor 110, different from this, only two or more than two constant speed compressors, or only two or more than two inverter compressors may be used.

INDUSTRIAL APPLICABILITY

As described, the thermal storage air conditioner of the present invention has the outdoor unit, the indoor unit, the thermal storage unit, and the functional unit provided separately, and connected to one another.

Accordingly, the present invention can improve convenience of use at the end as connection/disconnection of the units is easy. That is, the easy connection/disconnection of the functional unit and the thermal storage unit permits to connect the functional unit and the thermal storage unit even to an existing air conditioner.

Moreover, the thermal storage unit has a plurality of the thermal storage heat exchangers in the thermal storage tank. Accordingly, a contact area to the thermal storage substance increases compared to a case only one thermal storage heat exchanger is used, thereby improving heat exchange efficiency.

Moreover, the thermal storage air conditioner of the present invention controlled such that some of the plurality of the thermal storage heat exchangers are operated according to a load on the indoor heat exchanger, automatically. Accordingly, the thermal storage air conditioner of the present invention has an advantage in that energy can be saved relative to a related art air conditioner in which a large capacity thermal storage heat exchanger is operated regardless of a number of operation of the plurality of the indoor units.

The invention claimed is:
1. A thermal storage air conditioner comprising:
an outdoor unit having an outdoor heat exchanger for making heat exchange, and at least one compressor for compressing refrigerant;
an indoor unit having a plurality of indoor heat exchangers for making heat exchange;
a thermal storage unit for storing energy, the thermal storage unit having a plurality of thermal storage heat exchangers for making heat exchange between the refrigerant and a thermal storage substance, said thermal storage substance being inside said thermal storage unit; and
a functional unit having a plurality of valves for selective control of refrigerant flows among the outdoor unit, the indoor unit and the thermal storage unit according to an operation mode, and a valve controller for making a unitary control of operation of the valves,
wherein the outdoor unit, the functional unit and the thermal storage unit are installed spaced apart from one another, each connected to the indoor unit,
wherein the valve controller is configured to perform the operation mode, and wherein the operation mode includes:
a thermal storage mode in which the refrigerant circulates through the functional unit, the outdoor unit and the thermal storage unit for storing energy in the thermal storage unit;

a room cooling or heating with stored heat mode in which the refrigerant circulates through the functional unit, the indoor unit and the thermal storage unit so that a room is conditioned with energy stored in the thermal storage unit;

a direct room cooling or heating mode in which the refrigerant circulates through the functional unit, the outdoor unit and the indoor unit so that a room is conditioned by using the outdoor unit, wherein the functional unit further includes:

a supplementary flow line for heat exchanging refrigerant heat exchanged at the indoor unit and supplying refrigerant to the thermal storage unit during the room cooling or heating with stored heat mode, and a supplementary heat exchanger provided in the supplementary flow line for heat exchange between the refrigerant heat exchanged at the indoor unit and an outdoor air, wherein, the supplementary heat exchanger is operated selectively in the room cooling or heating with stored heat mode and is smaller than the outdoor heat exchanger.

2. The thermal storage air conditioner as claimed in claim 1, wherein the functional unit further includes:

a first supplementary pump having one side connected to a pipe line connected to the thermal storage heat exchangers of the thermal storage unit and the other side connected to a pipe line connected to the indoor unit, for pumping refrigerant heat exchanged at the thermal storage unit to the indoor unit.

3. The thermal storage air conditioner as claimed in claim 2, wherein the functional unit includes:

a second supplementary pump for forcing a refrigerant flow through the supplementary flow line.

4. The thermal storage air conditioner as claimed in claim 1, wherein the valve controller is connected to a main controller which makes general control of the outdoor unit, the indoor unit, and the thermal storage unit, to receive information on an operation mode from the main controller.

5. The thermal storage air conditioner as claimed in claim 1, wherein the indoor unit includes a plurality of indoor expansion devices for expanding refrigerant introduced to the indoor heat exchangers respectively and an indoor controller for controlling operation of the indoor expansion devices.

6. The thermal storage air conditioner as claimed in claim 5, wherein the thermal storage unit includes a plurality of thermal storage expansion devices for expanding refrigerant introduced to the thermal storage heat exchangers respectively, and a thermal storage controller for controlling operation of the thermal storage expansion devices according to a number of the indoor heat exchangers of the indoor unit under operation.

7. The thermal storage air conditioner as claimed in claim 6, wherein the indoor controller and the thermal storage controller are controlled by the main controller which controls general operation of the outdoor unit, the indoor unit, the thermal storage unit, and the functional unit.

8. The thermal storage air conditioner as claimed in claim 1, wherein the thermal storage unit includes a plurality of thermal storage expansion devices for expanding refrigerant introduced to the thermal storage heat exchangers respectively, and a thermal storage controller for controlling operation of the thermal storage expansion devices.

9. The thermal storage air conditioner as claimed in claim 1, wherein the compressor of the outdoor unit includes at least one constant speed compressor, which is operated at a fixed speed.

10. The thermal storage air conditioner as claimed in claim 1, wherein the compressor of the outdoor unit includes at least one inverter compressor which can be operated at a variable speed.

11. The thermal storage air conditioner as claimed in claim 1, wherein the compressor of the outdoor unit includes a combination of at least one constant speed compressor and at least one inverter compressor which runs at a variable speed.

12. The thermal storage air conditioner as claimed in claim 11, wherein the constant speed compressor is driven separate from the inverter compressor.

13. The thermal storage air conditioner as claimed in claim 11, wherein the constant speed compressor is driven at the same time the inverter compressor.

14. The thermal storage air conditioner as claimed in claim 11, wherein the constant speed compressor and the inverter compressor are operated selectively according to a number of the indoor heat exchangers of the indoor unit under operation.

* * * * *